US011839982B2

(12) United States Patent
Bufford, Jr.

(10) Patent No.: US 11,839,982 B2
(45) Date of Patent: Dec. 12, 2023

(54) SYSTEMS AND METHODS FOR REAL-TIME CONTROL OF A ROBOT USING A ROBOT ANIMATION SYSTEM

(71) Applicant: Animax Designs, Inc., Nashville, TN (US)

(72) Inventor: Harold Fred Bufford, Jr., New Orleans, LA (US)

(73) Assignee: Animax Designs, Inc., Nashville, TN (US)

( * ) Notice: Subject to any disclaimer, the term of this patent is extended or adjusted under 35 U.S.C. 154(b) by 0 days.

(21) Appl. No.: 17/984,923

(22) Filed: Nov. 10, 2022

(65) Prior Publication Data

US 2023/0150133 A1    May 18, 2023

Related U.S. Application Data

(60) Provisional application No. 63/278,793, filed on Nov. 12, 2021.

(51) Int. Cl.
*B25J 9/16* (2006.01)
*B25J 13/00* (2006.01)

(52) U.S. Cl.
CPC .......... *B25J 9/1669* (2013.01); *B25J 13/006* (2013.01)

(58) Field of Classification Search
CPC ..... B25J 9/1669; B25J 13/006; H04L 63/061; H04L 9/0827
See application file for complete search history.

(56) References Cited

U.S. PATENT DOCUMENTS 11,734,744 B2 *  8/2023  Lee ................. H04N 23/65
                                        434/127
2015/0089222 A1 *  3/2015  White .............. H04W 12/04
                                        713/168

(Continued)

FOREIGN PATENT DOCUMENTS

CN     206242070 U    6/2017
CN     107443379 A   12/2017
(Continued)

OTHER PUBLICATIONS

Jun. 9, 2023 International Search Report issued by the International Searching Authority of Singapore for PCT International Application No. PCT/US2022/049622.
(Continued)

*Primary Examiner* — Harry Y Oh
*Assistant Examiner* — Sohana Tanju Khayer
(74) *Attorney, Agent, or Firm* — Duane Morris LLP

(57) ABSTRACT

Various systems and methods for controlling a target device are disclosed. For example, a system includes a user computing device including a user interface, a user motion database communicatively coupled to the user computing device, a controller, a controller motion database communicatively coupled to the controller, and a target device communicatively coupled to the controller. The user computing device can be configured to connect the user motion database and the controller motion database to share corresponding sets of motion instructions in real-time in response to receiving a sync indication from the user computing device. The target device can be configured to implement the corresponding sets of motion instructions in real-time on the target device.

20 Claims, 5 Drawing Sheets

(56) References Cited

U.S. PATENT DOCUMENTS

| | | | | |
|---|---|---|---|---|
| 2015/0217449 A1* | 8/2015 | Meier | ................. | G05D 1/0088 |
| | | | | 901/1 |
| 2016/0195390 A1* | 7/2016 | Nissen | .................... | B25J 5/007 |
| | | | | 901/44 |
| 2016/0232338 A1* | 8/2016 | Guo | ...................... | G06F 21/316 |
| 2018/0178372 A1* | 6/2018 | Lee | ........................ | G06V 20/10 |
| 2018/0303425 A1* | 10/2018 | Wordham | ............ | A61B 5/6823 |
| 2018/0370028 A1* | 12/2018 | De Zulueta | .......... | G05D 1/0238 |
| 2020/0146496 A1* | 5/2020 | Patadia | ................. | A47J 36/321 |
| 2020/0164519 A1* | 5/2020 | Lee | ........................ | G06F 3/165 |
| 2020/0410735 A1* | 12/2020 | Gorbatyuk | .............. | G06T 13/40 |
| 2021/0110203 A1* | 4/2021 | Cope | ...................... | G06V 20/58 |
| 2021/0407164 A1* | 12/2021 | Chamdani | ............... | G06T 13/40 |
| 2022/0241014 A1* | 8/2022 | Kleyman | .................. | G06N 3/08 |

FOREIGN PATENT DOCUMENTS

| | | |
|---|---|---|
| CN | 110154031 A | 8/2019 |
| WO | 2023086524 A2 | 5/2023 |

OTHER PUBLICATIONS

Jun. 9, 2023 Written Opinion of the International Searching Authority of Singapore for PCT International Application No. PCT/US2022/049622.

* cited by examiner

SYSTEMS AND METHODS FOR REAL-TIME CONTROL OF A ROBOT USING A ROBOT ANIMATION SYSTEM

CROSS-REFERENCE TO RELATED APPLICATION

This application claims the benefit of priority under 35 U.S.C. § 119(e) to prior U.S. Provisional Application No. 63/278,793, filed Nov. 12, 2021, the disclosure of which is incorporated by reference herein in its entirety.

FIELD

The present disclosure relates to control systems and more particularly to control systems operating in real-time using database connectivity.

BACKGROUND

Currently, a variety of control systems exist with individualized sets of capabilities that are not integrated into one system and are not created to work together as a single system. For example, traditional control system workflows may allow motion editing through systems integrated with programmable logic controllers (PLCs) requiring exporting and importing of motion edit data. These traditional control systems do not allow real-time editing and may require a plurality of software packages to provide the ability to edit the necessary motion parameters for the target device. Additionally, traditional control systems do not include the ability to visualize and interact with the target device in real-time. Even if the subsystems could operate together, the workflow will be slow as the connection between subsystems can involve additional work, and the time to iterate can be in hours or longer.

The present disclosure addresses these challenges and problems such that the control system may contain two databases with the ability to sync during programming allowing real-time visualization, interactivity, and kinematics modeling of the target device.

SUMMARY

In accordance with one or more embodiments, a robot animation system for controlling a robot in real-time control is provided. The system can include a user computing device having a user interface, a user motion database communicatively coupled to the user computing device, a controller, a controller motion database communicatively coupled to the controller, and a target device communicatively coupled to the controller. The user computing device can be configured to, in response to receiving a sync indication from the user computing device, connect the user motion database and the controller motion database to share corresponding sets of motion instructions in real-time. The target device can be configured to implement the corresponding sets of motion instructions in real-time on the target device.

In accordance with another embodiment, a method for controlling a robot in real-time is provided. The method can include receiving a sync indication from a user computing device at a user motion database, the user computing device including a user interface. The method can also include connecting the user motion database and a controller motion database to share corresponding sets of motion instructions in real-time. The method can further include implementing, on a target device via a controller, the corresponding sets of motion instructions shared as a result of the connecting in real-time.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
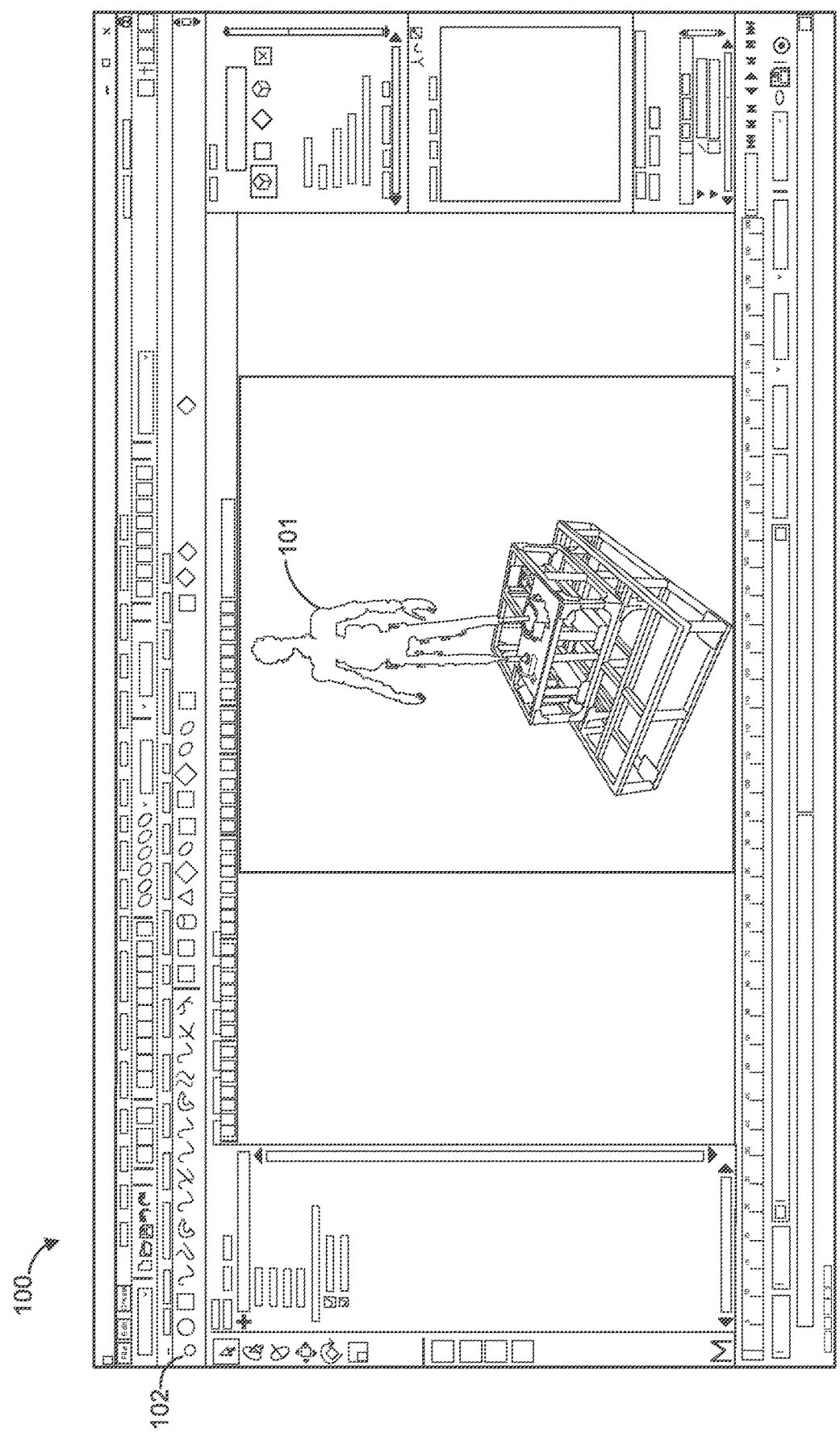
FIG. 1 is an example user interface of a robot animation system in accordance with some embodiments.

A control system, such as a robot animation system, allows life-like motion to be created on a robot through a series of interconnected sub-systems. More particularly, the robot animation system implements multiple databases, including a user motion database and a controller motion database, to allow for user-side modifications to robot instructions prior to syncing the databases and, in turn, providing life-like, uninterrupted motion of the robot. Moreover, the robot animation system allows for an improved workflow that is fast as well as iterative.

That is, the method of providing a user computing device with a user interface communicatively coupled to a user motion database allows the user or animator to update the controller instructions with additions, edits, etc., to the intended motion of the robot and immediately have those changes reflected on the user interface of the robot and the robot itself. The robot animation system includes a plurality of modules or subsystems with a variety of parameters, such as the type of movement, timing, and speed of the motion by the robot, that the user can modify on the user computing device to adjust or alter any robot motions to a desired appearance, angle, form, etc.

While the present disclosure is directed towards a particular system for controlling motion of a robot, the robot animation system is generally directed to collecting information from users, allowing that information to be modified in real-time, and then applies that information to a robot by implementing motion in the robot. Therefore, any target device other than a robot may be used that uses real-time data streams with configurable parameters that may be inserted.

Further, the robot animation system is designed to program the motion of a robot in real-time. As noted above, the robot animation system includes at least two databases that are kept in sync during programming. These databases include joint-space motion data for an animated figure, such as a robot. The controller motion database communicatively coupled to a controller will provide or store instructions for operation, indicating what motions to perform, in what sequence, at what time, allowing the robot to operate smoothly without being affected by any potential delays on the user computing device. In various implementations, the user may select a particular motion for a set of motions, such as head movement or moving the arms of the robot, or the user may select a corresponding item or part of the robot along with a timing to add a motion to the sequence of motions. Further, the user may order the different motions, such as moving the arms or head movement, along a timeline and drag and drop motions before or after other motions.

For example, at the beginning of an operating or programming session, the user may connect to the controller motion database by syncing with the controller motion database and connecting with a plurality of modules or stored data to operate a real-time system. Syncing with the controller motion database opens a bi-directional communication pathway between the user system and the robot system, operating in real-time. The user may make edits to any of the robot motion instructions or directions on the user interface of the motion profile of the robot, displayed on the user computing device. The user interface may provide a plurality of user interface elements selectable by a user and designed to correspond to various types and angles of motion for different parts or components of the robot. The user interface could also include user interface elements corresponding to a speed or a timeline of a sequence of motion by the robot. For example, the user may select a user interface element corresponding to a particular motion and adjust which portion of the robot performs the motion or adjust at what time in relation to other motions the particular motion occurs.

Then, when the user wants to have the motion reflected on or implemented by the robot, the user may select a user interface element on a robot animation application or program to sync the user motion database with the controller motion database instantly using packed data, or at least one packet of data or instruction message, over a distributed communications system or network. These instructions may include frame numbers corresponding to a specific motion at a specific time along a timeline of a sequence of motions. Once the two databases are in sync, a variety of control modes become available for implementation for moving the robot. The control modes can include a play mode, a go-to specific point mode, etc. discussed further below. The variety of control modes are user-selectable as icons on the user interface of the robot animation application and target a specific point in a motion profile of instructions. The control modes may also target a program for the robot to implement or involve implementing the motions on the robot and/or on the robot on the user interface at full speed.

When using a play mode, the user interface may send a command to a controller that transmits the actual motion instructions to the robot to start playing or implementing motion instructions received and start listening for a current frame number. When the controller receives the play command, the controller will instruct the robot to begin running the animation and sending the current frame number to the user interface, depicting to the user the actual, real-time motions of the robot. By receiving the current frame number, the user interface can display the actual motions of the robot in sync with the controller instructing the robot to perform the motions. When using a go-to specific point mode, the user interface instructs, in real-time, the controller which frame to implement. That is, the user operating the user computing device can via the user interface of the robot animation application, instruct the robot in real-time to perform a particular motion associated with a particular frame.

A user interface model of the robot is displayed on the user interface of the user computing device to display to the user real-time motion of the robot as well as to provide a method for the user to program the motion of the robot, for example, by defining particular position or motion parameters for a variety of frames. The robot animation system may have a variety of different user interfaces on the robot animation application with a variety of different features provided to the user for robot control and display.

In various implementations, the robot animation application includes three-dimensional visual representations of the robot (for example, as shown in FIG. 1) and allows for a rig to be built within the robot animation application, providing a method of robot manipulation. Additionally, or alternatively, the user interface may be more simplistic, including capabilities such as recording a data point of position information, which may include a few or a lot of different positional parameters. The robot animation system is designed so that the user interface may be separate from other parts of the robot animation system and is specifically directed to providing a method for the user to view robot motion and to indicate the motion the robot should make.

In various implementations, an identical model is created for use in the real-time controller. These two models allow the system to be programmed in the space used in the user interface, and then played back and converted to the space used by actuators of the robot that are instructed to move by the controller and implement the motion on the robot. The model implemented in the real-time controller converts the data between spaces at the same rate the controller is operating.

The robot animation system may also include a series of settings on the real-time controller that affect the motion of the robot. These settings are variables used in a plurality of equations to create the motion of the figure of the robot on the user interface in various modes. Examples settings can include a gain multiplier in the motion proportional, integral (PI) loop, an initial direction of homing, and expected counts during homing. For example, more than 100 individual settings exist for each motor. These settings can be modified while the robot is in motion to change the behavior of each axis individually (for example, see FIG. 4). These settings allow the shaping of each actuator response to the motion profile. The described settings can be edited by a user interface, as well as through an application programming interface (API) in the controller. That is, for example, the controller may include an interface as well as a plurality of robot control options for operation by an operator. Therefore, the described API can allow the settings of the robot to be modified during motion to suit a variety of needs from the robot.

In various embodiments, the robot animation system provides an external visualization tool to be used to view and potentially control the robot. Some existing systems support this natively, such as Maya, Cinema4D, and Blender. Others, such as a lighting system, do not have this support and thus another tool needs to be used to provide external visualization, such as Sim Mechanics, Unity, and Unreal. However, external visualization is integrated for all features of the robot animation system, allowing anyone on the network (which may be local or over a distributed communication system) to visualize the location of all joints of the robot in real-time. In general, an accurate representation of the figure, which can be viewed from any angle, is exceptionally useful, especially when access to the figure is limited. In various implementations, the robot animation system uses network communication with packed data to send the position of each joint as the positions are changed through the network to the user computing device, and potentially other network devices.

The robot animation system is configured to allow for interactivity between the user input and the robot as well as pre-programmed data. In various implementations, the robot animation system includes features that allow an external data stream to be used with each motion. That is, external data may be used to influence the motion of the robot. For example, motion data is presented to the robot animation system as position data, which is represented as a 32-bit floating point number between 0 and 1. These data streams can be received from different sources such as a joystick, artificial intelligence (AI), a game system, etc. In an implementation including an interactive system, using sensor data to create on-the-fly motion profiles, this data can be blended into or transitioned to and from the motion profile data.

As described above, the methods implemented for the user and controller motion databases to store, sync, and use the received and stored data is unique compared to any existing system. For example, using exact copies of the data in two locations (databases), which can be synced instantly, and then used to keep the user interface robot and the robot moving at the same time is new and unique to the robot animation system. As noted previously, the sync is initiated by the user any time the user chooses, for example, by selecting a button or user interface element labelled "sync." For example, the user may implement the sync when the user has finished editing on the user interface of the robot animation application and would like to see the new, edited motion of the robot.

Due to the speed and ease with which the user can implement the sync, the sync allows even small changes to be viewed instantly. The ability to sync is part of the robot animation system that provides the ability to produce the best performance possible on the robot. Moreover, the robot animation system can implement the sync to provide visualization of the robot via the figure and implemented on the robot, allowing for interactivity to be integrated into the robot animation system easily, and further allowing for motion parameters to be edited in real-time by the user and the API. It will be apparent to one of skill in the art that the robot animation system of the present disclosure is distinguished over other systems used to control robots. For example, the robot animation system allows for a single system to control and display the robot in real-time through the synchronization between the user and controller motion databases.

Furthermore, because the robot animation system is supporting a workflow, a significant amount of the underlying technology can be changed while still accomplishing the same result. For example, the user motion database may be implemented using Autodesk Maya as the primary data store, which may be substituted for Blender, or a proprietary program and the functionality of the robot animation system would still be the same.

The robot animation system defines a workflow in which the user can work with tools they are familiar with, which include features that allow them to perform necessary tasks quickly and efficiently to adjust or update the motion of a robot. As noted above, the abilities of the robot animation system include instantly seeing edits on the figure of the user interface and the robot, being able to go to a frame with a single click, and the ability to scrub the timeline live on the figure. When the creative workflow is finished, the data in the robot animation system is already updated and the figure is ready to run. This is because during the syncing step the user motion database and the controller motion database are updated. The robot animation system also takes all the parameters necessary for shaping the motion of the robot and puts them in a single tool, which is easy to use. Moreover, the additional tools like visualization, interactivity, and real-time kinematics modeling and models are excluded from other systems.

Referring now to FIG. 1, an example user interface 100 of a robot animation system in accordance with some embodiments is shown. As depicted, the example user interface 100 shows a figure robot 101 within an example modification application being operated on a user computing device. That is, the modification application is viewable to a user, where the user can see the real-time motion of the robot via the figure robot 101 and, using the various toolbars, such as toolbar 102, on the example user interface 100, the user may modify and update any desired motions to instruct the robot.

Figure 2:
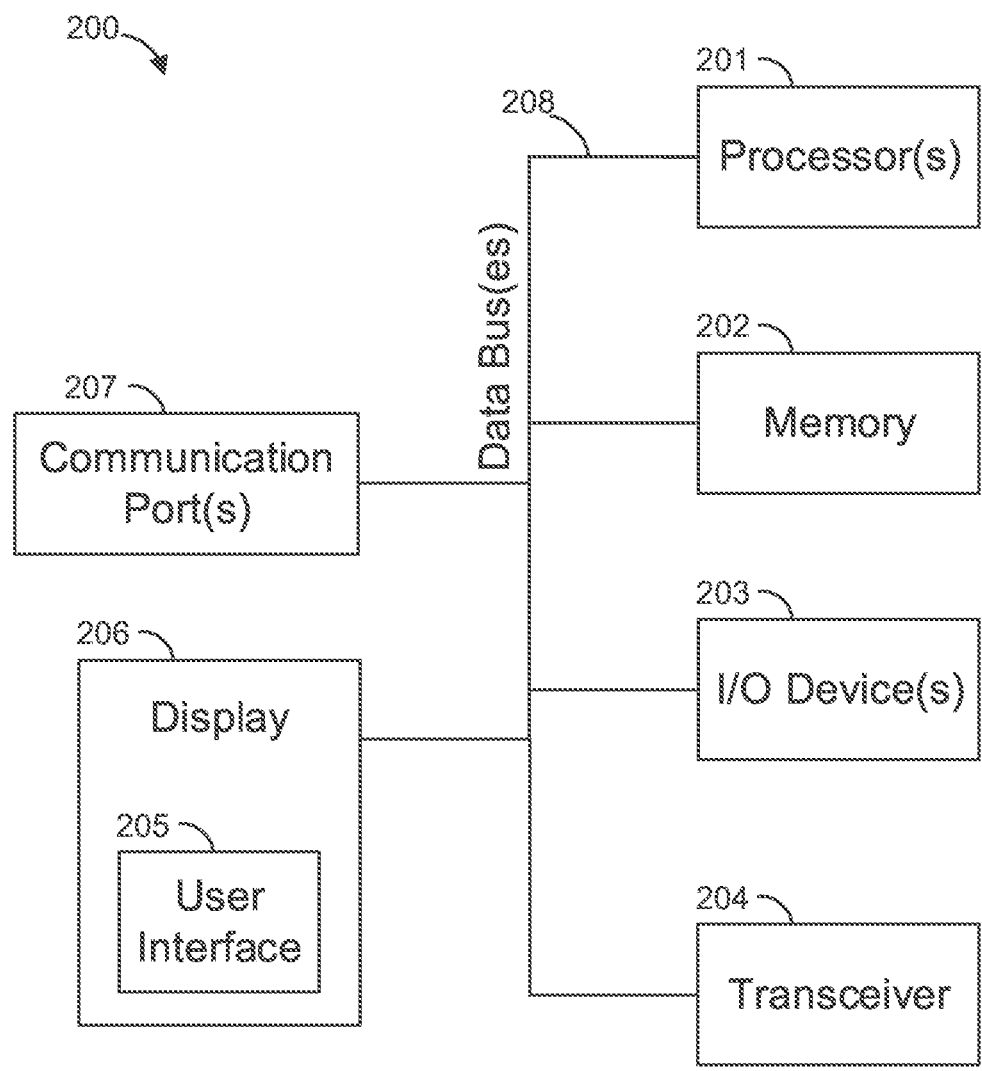
FIG. 2 is a block diagram of an example computing device in accordance with some embodiments.

Referring to FIG. 2, a block diagram of an example computing device 200 in accordance with some embodiments is shown. FIG. 2 illustrates an exemplary computing device 200 that can be employed by a disclosed system or used to execute a disclosed method. Computing device 200, such as a user computing device or controller of FIG. 3, can implement, for example, one or more of the functions described herein. It should be understood, however, that other computing device configurations are possible.

Computing device 200 can include one or more processors 201, memory 202, one or more input/output devices 203, a transceiver 204, one or more communication ports 207, and a display 206, all operatively coupled to one or more data buses 208. Data buses 208 allow for communication among the various devices. Data buses 208 can include wired, or wireless, communication channels. Data buses 208 are connected to one or more devices.

Processors 201 can include one or more distinct processors, each having one or more cores. Each of the distinct processors can have the same or different structures. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory, embodying the function or operation. For example, processors 201 can be configured to perform one or more of any function, method, or operation disclosed herein.

Memory 202 can include an instruction memory that can store instructions that can be accessed (e.g., read) and executed by processors 201. For example, the instruction memory can be a non-transitory, computer-readable storage medium such as a read-only memory (ROM), an electrically erasable programmable read-only memory (EEPROM), flash memory, a removable disk, CD-ROM, any non-volatile memory, or any other suitable memory. For example, the instruction memory can store instructions that, when executed by one or more processors 201, cause one or more processors 201 to perform one or more of the functions of an image reconstruction system.

Memory 202 can also include a working memory. Processors 201 can store data to, and read data from, the working memory. For example, processors 201 can store a working set of instructions to the working memory, such as instructions loaded from the instruction memory. Processors 201 can also use the working memory to store dynamic data created during the operation of computing device 200. The working memory can be a random access memory (RAM) such as a static random access memory (SRAM) or dynamic random access memory (DRAM), or any other suitable memory.

Input/output devices 203 can include any suitable device that allows for data input or output. For example, input/output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory. In some examples, communication port(s) 207 allow for the transfer (e.g., uploading or downloading) of data.

Display 206 can display user interface 205. User interfaces 205 can enable user interaction with computing device 200. In some examples, a user can interact with user interface 205 by engaging input/output devices 203. In some examples, display 206 can be a touchscreen, where user interface 205 is displayed on the touchscreen.

Transceiver 204 can allow for communication with a network, such as a Wi-Fi network, an Ethernet network, a cellular network, or any other suitable communication network. For example, if operating in a cellular network, transceiver 204 is configured to allow communications with the cellular network. Processor(s) 201 is operable to receive data from, or send data to, a network via transceiver 204.

Figure 3:
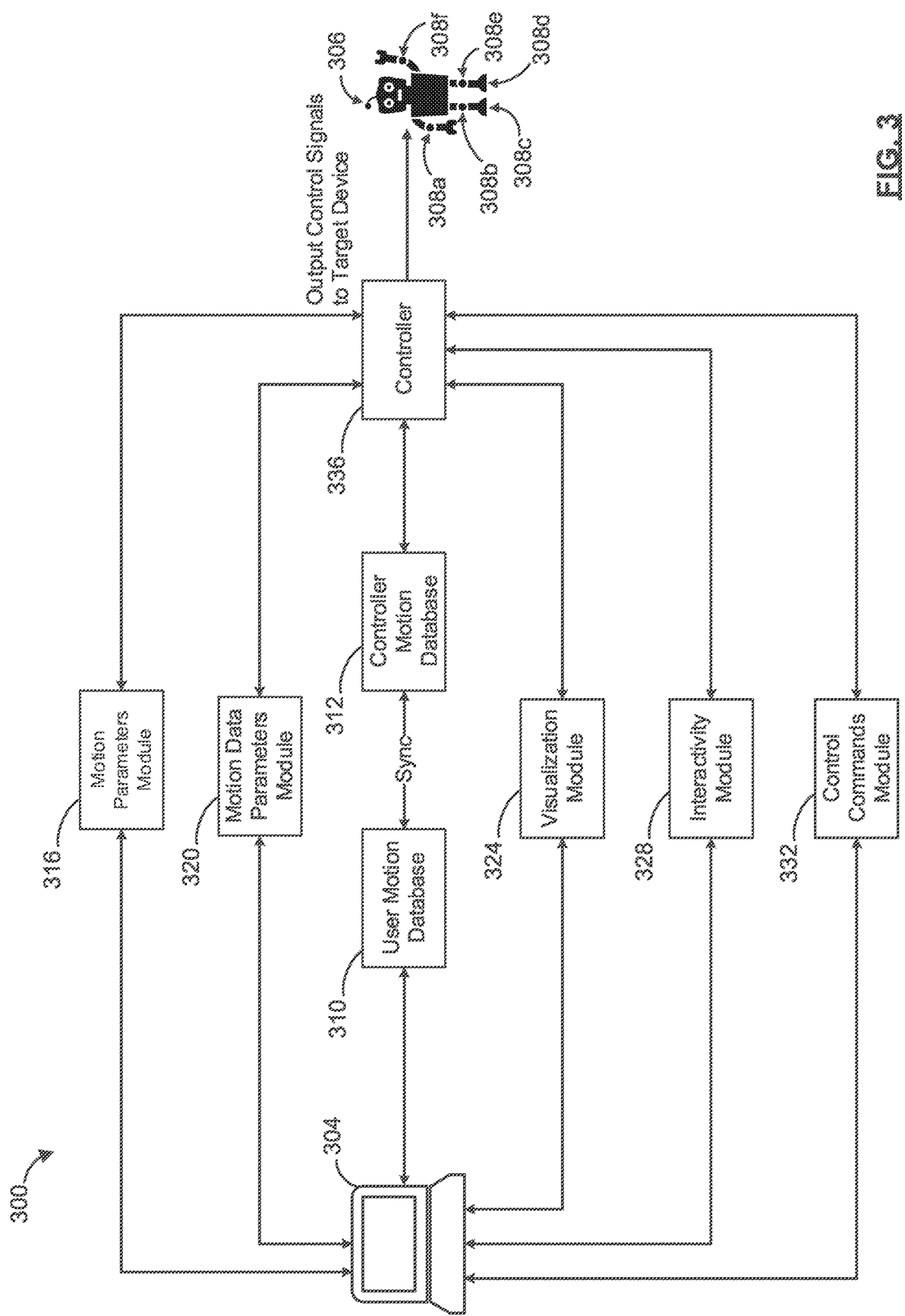
FIG. 3 is an example functional block diagram of a robot animation system in accordance with some embodiments.

Referring to FIG. 3, an example functional block diagram of a robot animation system 300 in accordance with some embodiments is shown. The robot animation system 300 includes a user computing device 304, such as a mobile computing device, laptop, tablet, desktop, etc., that can operate a robot animation application, through which a user can modify and see motion of the target device 306, such as the robot illustrated in FIG. 3. As noted previously, the target device 306 includes a plurality of actuators located at a plurality of positions 308a-308f across the target device 306 to perform or execute movements. While only six actuators and positions are shown, it can be appreciated the plurality of actuators can be located at any location on the target device 306 that can be instructed to move and is not limited by the example shown in FIG. 3.

The user computing device 304 updates a user motion database 310 with any changes to the motion information to instruct the target device 306. As a result of the sync, the bi-directional communication between the user motion database 310 and a controller motion database 312, such as a robot motion database, begins, allowing for a motion parameters module 316, a motion data parameters module 320, a visualization module 324, an interactivity module 328, and a control commands module 332 to also sync between the user computing device 304 and a controller 336, such as a robot controller. The user computing device 304 and controller 336 sync upon user selection on the user computing device 304 to allow for real-time visualization of the figure on the user interface, such as user interface 205, of the user computing device 304 and of the target device 306 due to the controller 336 outputting the control signals to the target device 306 that were indicated in the user motion database 310 as a result of the sync.

For example, the control commands module 332 may include specific information regarding which frame, including particular motion instructions from the motion parameters module 316 and/or the motion data parameters module 320, to follow, indicating which motion to implement. In various implementations, the visualization module 324 allows for real-time feedback to the user computing device 304 for the user to visualize the motions of the target device 306. Further, the interactivity module 328 allows for real-time user input via the user computing device 304, for example through the input/output device(s) 203 and/or display 206, to control the target device 306.

Figure 4:
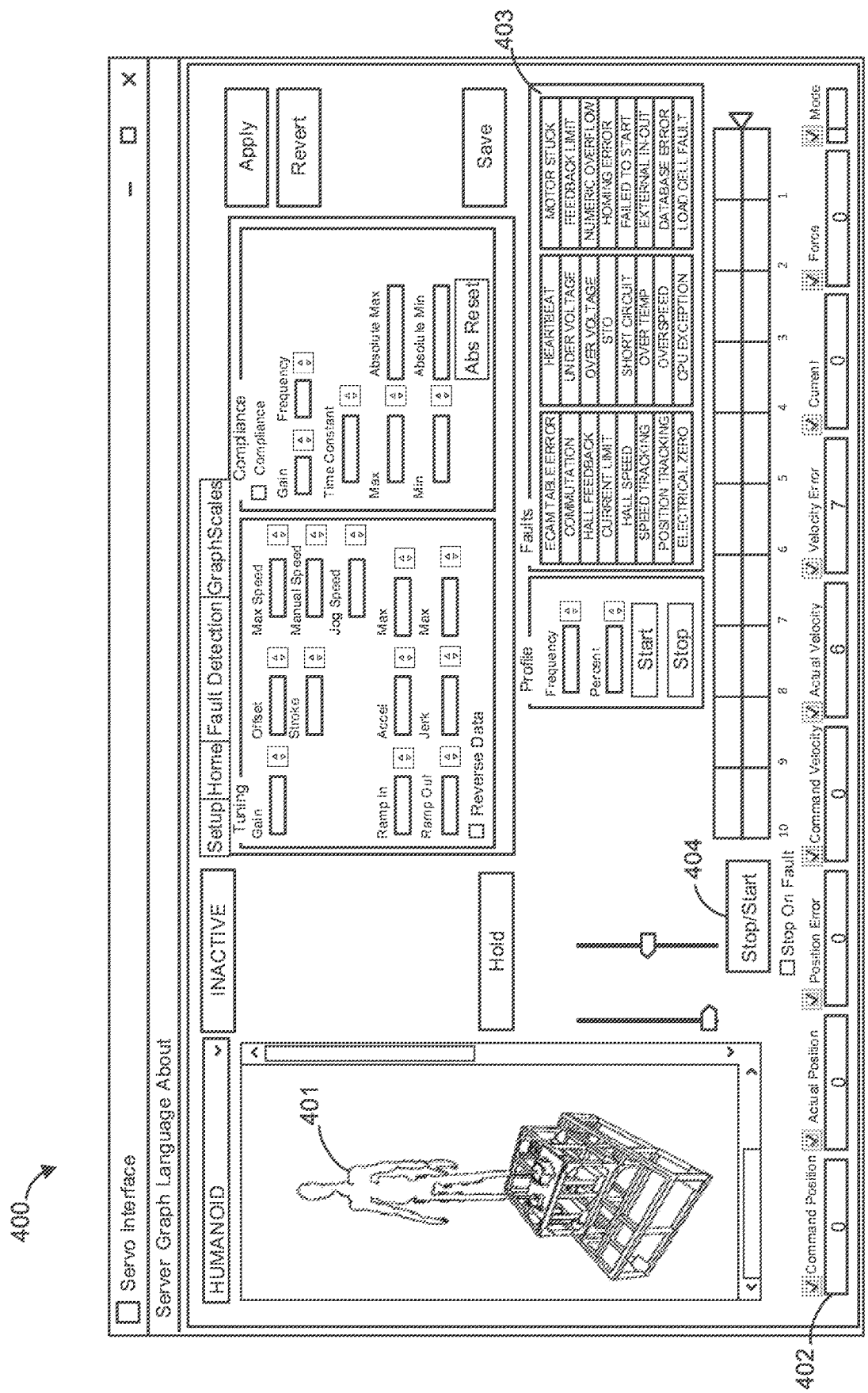
FIG. 4 is an example user interface for controlling a motion of a robot through a robot animation system in accordance with some embodiments.

Referring now to FIG. 4, an example user interface 400 for controlling a motion of a robot through a robot animation system in accordance with some embodiments is shown. For example, the example user interface 400 depicts an example of the robot animation application through which motion parameters of the robot 401 may be viewed and set. The user may adjust different motions at different points on the robot and at different times. The user interface 400 may also provide indications 402 of variance between the commanded motion settings, such as position and velocity, of the robot 401 compared to the actual motion of the robot 401. In some embodiments, user interface 400 may also include fault indications 403. These fault indications 403 could include faults to or from the robot 401 and/or other components of the robot animation system, such as the user motion database 310 or controller motion database 312. The user interface 400 may also include a play interface element 404 to allow the user to start and stop the robot 401.

Figure 5:
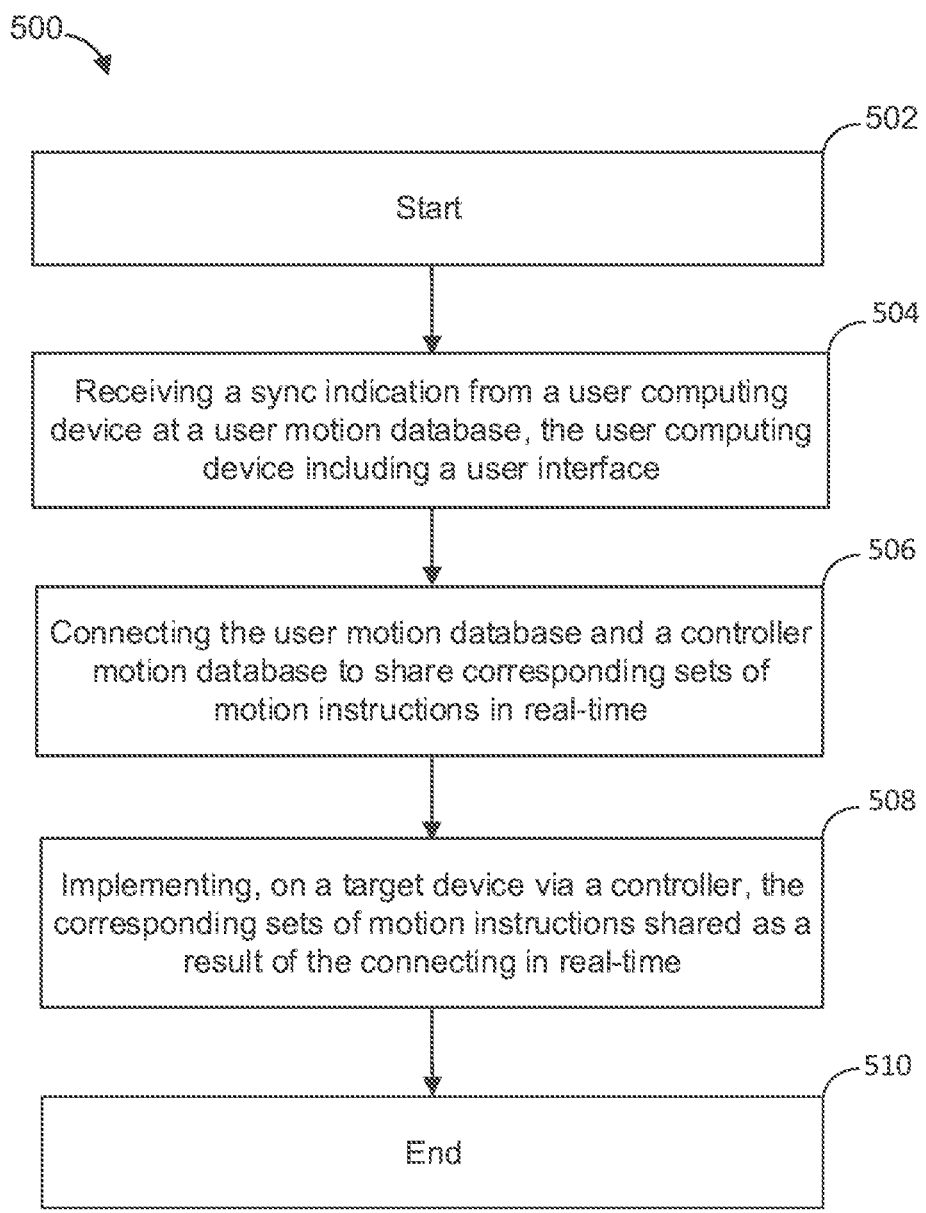
FIG. 5 is an example flowchart of a method of operating the robot animation system in accordance with some embodiments.

Referring to FIG. 5, a flowchart of an example method 500 of operating the robot animation system 300 in accordance with some embodiments is shown. The method 500 begins at step 502. At step 504, a sync indication is received from a user computing device 304 at a user motion database 310, the user computing device 304 may further include a user interface 100. At step 506, the user motion database 310 and a controller motion database 312 are connected to share corresponding sets of motion instructions in real-time. At step 508, a target device 306, via a controller 336, implements the corresponding sets of motion instructions shared as a result of the connecting in real-time. The method 500 ends at step 510.

In some embodiments, the method 500 can include displaying a FIG. 101 on the user interface 100 of the user computing device 304 and executing movements, using the FIG. 101, corresponding to the implemented corresponding sets of motion instructions in real-time. In further embodiments, the method 500 can include receiving, at the user computing device 304, user input and update the corresponding sets of motion instructions in real-time in response to the sync indication being been transmitted from the user computing device 304. In some embodiments, the method 500 can include obtaining the sets of motion instructions from the user motion database 310, wherein the sets of motion instructions were previously uploaded and stored in the user motion database 310. The method 500 can then generate and display user-selectable user interface elements, such as elements found in the toolbar 102, corresponding to each motion of the sets of motion instructions on the user interface 100 of the user computing device 304. The method 500, in some embodiments, can further include implementing the corresponding sets of motion instructions in real-time on the target device 306 in response to receiving a play instruction from the user computing device 304.

A system includes a user computing device including a user interface, a user motion database communicatively coupled to the user computing device, a controller, a controller motion database communicatively coupled to the controller, and a target device communicatively coupled to the controller. The user computing device configured to, in response to receiving a sync indication from the user computing device, connect the user motion database and the controller motion database to share corresponding sets of motion instructions in real-time. The target device is configured to implement the corresponding sets of motion instructions in real-time on the target device.

In some embodiments, a figure is displayed on the user interface of the user computing device, the figure being configured to execute movements corresponding to the implemented corresponding sets of motion instructions in real-time.

In some embodiments, the user computing device is configured to receive user input and update the corresponding sets of motion instructions in real-time in response to the sync indication being been transmitted from the user computing device.

In some embodiments, the user computing device is configured to obtain the sets of motion instructions from the user motion database, wherein the sets of motion instructions were previously uploaded and stored in the user motion database. The user computing device may also generate and display a plurality of user-selectable user interface elements corresponding to each motion of the sets of motion instructions on the user interface of the user computing device.

In some embodiments, the target device is configured to implement the corresponding sets of motion instructions in real-time on the target device in response to receiving a play instruction from the user computing device.

In some embodiments, the corresponding sets of motion instructions are implemented on the target device by the user computing device transmitting a set of frames in a predetermined order to the target device.

In some embodiments, each motion of the sets of motion instructions includes (i) instructions to execute movements via the figure and (ii) instructions to execute movements on the target device.

In some embodiments, the target device includes a plurality of actuators to execute movements on the target device.

In some embodiments, the sync indication is transmitted in response to selection of a user-selectable interface element displayed on the user interface of the user computing device.

In some embodiments, the controller receives the sets of motion instructions from the controller motion database and the controller selects the sets of motion instructions associated with instructions to execute movements on the target device to transmit to the target device.

In some embodiments, a method includes receiving a sync indication from a user computing device at a user motion database, the user computing device including a user interface. The method also includes connecting the user motion database and a controller motion database to share corresponding sets of motion instructions in real-time. The method further includes implementing, on a target device via a controller, the corresponding sets of motion instructions shared as a result of the connecting in real-time.

In some embodiments, a method includes displaying a figure on the user interface of the user computing device, and executing movements, using the figure, corresponding to the implemented corresponding sets of motion instructions in real-time.

In some embodiments, a method includes receiving, at the user computing device, user input and updating the corresponding sets of motion instructions in real-time in response to the sync indication transmitted from the user computing device.

In some embodiments, a method includes obtaining the sets of motion instructions from the user motion database, wherein the sets of motion instructions were previously uploaded and stored in the user motion database, generating and displaying a plurality of user-selectable user interface elements corresponding to each motion of the sets of motion instructions on the user interface of the user computing device.

In some embodiments, a method includes implementing the corresponding sets of motion instructions in real-time on the target device in response to receiving a play instruction from the user computing device.

In some embodiments of a method, the corresponding sets of motion instructions are implemented on the target device by the user computing device transmitting a set of frames in a predetermined order to the target device.

In some embodiments of a method, each motion of the sets of motion instructions includes (i) instructions to execute movements via the figure and (ii) instructions to execute movements on the target device.

In some embodiments of a method, the target device includes a plurality of actuators to execute movements on the target device.

In some embodiments of a method, the sync indication is transmitted in response to selection of a user-selectable interface element displayed on the user interface of the user computing device.

In some embodiments of a method, the controller receives the sets of motion instructions from the controller motion database and the controller selects the sets of motion instructions associated with instructions to execute movements on the target device to transmit to the target device.

Although the methods described above are with reference to a flowchart, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a user computing device including a user interface;
a user motion database communicatively coupled to the user computing device;
a controller;
a controller motion database communicatively coupled to the controller; and
a target device communicatively coupled to the controller,
the user computing device being configured to:
in response to receiving a sync indication from the user computing device, connect the user motion database and the controller motion database to share corresponding sets of motion instructions in real-time through bi-directional communication, wherein the sync indication also syncs each of a motion parameters module, a motion data parameters module, a visualization module, an interactivity module, and a control commands module between the user computing device and the controller allowing real-time interaction between the user computing device and the target device; and
the target device being configured to implement the corresponding sets of motion instructions in real-time on the target device.

2. The system of claim 1, wherein a figure is displayed on the user interface of the user computing device, the figure being configured to execute movements corresponding to the implemented corresponding sets of motion instructions in real-time.

3. The system of claim 1, wherein the user computing device is configured to receive user input and update the corresponding sets of motion instructions in real-time in response to the sync indication being transmitted from the user computing device.

4. The system of claim 1, wherein the user computing device is configured to:
obtain the sets of motion instructions from the user motion database, wherein the sets of motion instructions were previously uploaded and stored in the user motion database; and
generate and display a plurality of user-selectable user interface elements corresponding to each motion of the sets of motion instructions on the user interface of the user computing device.

5. The system of claim 1, wherein the target device is configured to implement the corresponding sets of motion instructions in real-time on the target device in response to receiving a play instruction from the user computing device.

6. The system of claim 5, wherein the corresponding sets of motion instructions are implemented on the target device by the user computing device transmitting a set of frames in a predetermined order to the target device.

7. The system of claim 1, wherein each motion of the sets of motion instructions includes (i) instructions to execute movements via the figure and (ii) instructions to execute movements on the target device.

8. The system of claim 1, wherein the target device includes a plurality of actuators to execute movements on the target device.

9. The system of claim 1, wherein the sync indication is transmitted in response to selection of a user-selectable interface element displayed on the user interface of the user computing device.

10. The system of claim 1, wherein the controller receives the sets of motion instructions from the controller motion database and the controller selects the sets of motion instructions associated with instructions to execute movements on the target device to transmit to the target device.

11. A method comprising:
receiving a sync indication from a user computing device at a user motion database, the user computing device including a user interface;
connecting the user motion database and a controller motion database to share corresponding sets of motion instructions in real-time through bi-directional communication; and
implementing, on a target device via a controller, the corresponding sets of motion instructions shared as a result of the connecting in real-time, wherein the sync indication also syncs each of a motion parameters module, a motion data parameters module, a visualization module, an interactivity module, and a control commands module between the user computing device and the controller allowing real-time interaction between the user computing device and the target device.

12. The method of claim 11, further comprising:
displaying a figure on the user interface of the user computing device; and
executing movements, using the figure, corresponding to the implemented corresponding sets of motion instructions in real-time.

13. The method of claim 11, further comprising receiving, at the user computing device, user input and updating the corresponding sets of motion instructions in real-time in response to the sync indication being been transmitted from the user computing device.

14. The method of claim 11, further comprising:
obtaining the sets of motion instructions from the user motion database, wherein the sets of motion instructions were previously uploaded and stored in the user motion database; and
generating and displaying a plurality of user-selectable user interface elements corresponding to each motion of the sets of motion instructions on the user interface of the user computing device.

15. The method of claim 11, further comprising implementing the corresponding sets of motion instructions in real-time on the target device in response to receiving a play instruction from the user computing device.

16. The method of claim 15, wherein the corresponding sets of motion instructions are implemented on the target device by the user computing device transmitting a set of frames in a predetermined order to the target device.

17. The method of claim 11, wherein each motion of the sets of motion instructions includes (i) instructions to execute movements via the figure and (ii) instructions to execute movements on the target device.

18. The method of claim 11, wherein the target device includes a plurality of actuators to execute movements on the target device.

19. The method of claim 11, wherein the sync indication is transmitted in response to selection of a user-selectable interface element displayed on the user interface of the user computing device.

20. The method of claim 11, wherein the controller receives the sets of motion instructions from the controller motion database and the controller selects the sets of motion instructions associated with instructions to execute movements on the target device to transmit to the target device.

* * * * *